(12) United States Patent
Wagner et al.

(10) Patent No.: US 11,203,115 B2
(45) Date of Patent: Dec. 21, 2021

(54) SYSTEMS AND METHODS FOR EFFICIENTLY MOVING A VARIETY OF OBJECTS

(71) Applicant: Berkshire Grey, Inc., Bedford, MA (US)

(72) Inventors: Thomas Wagner, Concord, MA (US); Kevin Ahearn, Fort Mill, SC (US); Benjamin Cohen, Somerville, MA (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey, Inc., Bedford, MA (US)

( * ) Notice: Subject to any disclaimer, the term of this patent is extended or adjusted under 35 U.S.C. 154(b) by 0 days.

(21) Appl. No.: 16/825,010

(22) Filed: Mar. 20, 2020

(65) Prior Publication Data
US 2020/0215684 A1   Jul. 9, 2020

Related U.S. Application Data

(63) Continuation of application No. 15/912,003, filed on Mar. 5, 2018, now Pat. No. 10,639,787.
(Continued)

(51) Int. Cl.
*B25J 15/06* (2006.01)
*B25J 15/00* (2006.01)
(Continued)

(52) U.S. Cl.
CPC ............. *B25J 9/1055* (2013.01); *B25J 9/108* (2013.01); *B25J 15/0004* (2013.01);
(Continued)

(58) Field of Classification Search
CPC .... B25J 15/0004; B25J 15/0616; B25J 17/02; B25J 9/1055; B25J 9/108; Y10S 901/29; Y10S 901/40; F16C 19/184; F16C 19/364
See application file for complete search history.

(56) References Cited

U.S. PATENT DOCUMENTS 2,853,333 A   9/1958   Littell
3,005,652 A   10/1961   Helm
(Continued)

FOREIGN PATENT DOCUMENTS

CH   701886 A2   3/2011
DE   3810989 A1   8/1989
(Continued)

OTHER PUBLICATIONS

Examiner's Report issued by the Innovation, Science and Economic Development Canada in related Canadian Patent Application No. 3,055,538 dated Jan. 28, 2021, 4 pages.
(Continued)

*Primary Examiner* — Dean J Kramer
(74) *Attorney, Agent, or Firm* — Gesmer Updegrove LLP

(57) ABSTRACT

A programmable motion system is disclosed that includes a dynamic end effector system. The dynamic end effector system includes an end effector that is coupled via a dynamic coupling to the programmable motion system, wherein the dynamic coupling provides that at least a portion of the end
(Continued)

effector may spin with respect to an other portion of the end effector.

60 Claims, 8 Drawing Sheets

Related U.S. Application Data

(60) Provisional application No. 62/467,509, filed on Mar. 6, 2017.

(51) Int. Cl.
| | | |
|---|---|---|
| *B25J 9/10* | (2006.01) | |
| *B25J 17/02* | (2006.01) | |
| *F16C 19/18* | (2006.01) | |
| *F16C 19/36* | (2006.01) | |

(52) U.S. Cl.
CPC ............ *B25J 15/0616* (2013.01); *B25J 17/02* (2013.01); *F16C 19/184* (2013.01); *F16C 19/364* (2013.01); *Y10S 901/29* (2013.01); *Y10S 901/40* (2013.01)

(56) References Cited

U.S. PATENT DOCUMENTS

| | | | |
|---|---|---|---|
| 3,195,941 A | 7/1965 | Morey | |
| 3,637,249 A | 1/1972 | Kuhl et al. | |
| 4,379,363 A | 4/1983 | Whitney | |
| 4,389,064 A | 6/1983 | Laverriere | |
| 4,557,659 A | 12/1985 | Scaglia | |
| 4,561,686 A | 12/1985 | Atchley | |
| 4,578,013 A | 3/1986 | Barillec et al. | |
| 4,604,787 A | 8/1986 | Silvers, Jr. | |
| 4,609,325 A | 9/1986 | Gabrielli | |
| 4,635,985 A | 1/1987 | Rooke | |
| 4,653,793 A | 3/1987 | Guinot et al. | |
| 4,677,778 A | 7/1987 | Sorimachi et al. | |
| 4,786,847 A | 11/1988 | Daggett et al. | |
| 4,828,304 A | 5/1989 | No et al. | |
| 4,846,619 A | 7/1989 | Crabtree et al. | |
| 4,850,627 A | 7/1989 | Franklin | |
| 5,017,084 A | 5/1991 | Lemelson | |
| 5,024,575 A | 6/1991 | Anderson | |
| 5,207,465 A | 5/1993 | Rich | |
| 5,244,338 A | 9/1993 | White | |
| 5,752,729 A | 5/1998 | Crozier et al. | |
| 5,777,267 A | 7/1998 | Szydel | |
| 5,791,861 A | 8/1998 | Seelig | |
| 5,865,487 A | 2/1999 | Gore et al. | |
| 5,909,941 A | 6/1999 | Cheng et al. | |
| 6,015,174 A | 1/2000 | Raes et al. | |
| 6,244,640 B1 | 6/2001 | Le Bricquer et al. | |
| 6,579,053 B1 | 6/2003 | Grams et al. | |
| 6,817,639 B2 | 11/2004 | Schmalz et al. | |
| 7,017,961 B1 | 3/2006 | Parnell et al. | |
| 7,263,890 B2 | 9/2007 | Takahashi | |
| 7,311,489 B2 | 12/2007 | Ekman | |
| 7,313,464 B1 | 12/2007 | Perreault et al. | |
| 7,474,939 B2 | 1/2009 | Oda et al. | |
| 7,618,074 B2 | 11/2009 | Zimmer | |
| 7,677,622 B2 | 3/2010 | Dunkmann et al. | |
| 8,070,203 B2 | 12/2011 | Schaumberger | |
| 8,132,835 B2 | 3/2012 | Ban et al. | |
| 8,146,971 B2 | 4/2012 | LaValley et al. | |
| 8,267,386 B2 | 9/2012 | Schaaf et al. | |
| 8,714,903 B2 * | 5/2014 | Feng ..................... | B25J 9/0051 414/735 |
| 8,777,284 B2 | 7/2014 | Schaller et al. | |
| 9,227,323 B1 | 1/2016 | Konolige et al. | |
| 9,266,237 B2 | 2/2016 | Nomura | |
| 9,283,680 B2 | 3/2016 | Yasuda et al. | |
| 9,415,975 B2 * | 8/2016 | Lundin ................ | B25J 15/0616 |
| 9,486,926 B2 | 11/2016 | Kawano | |
| 9,492,923 B2 | 11/2016 | Wellman et al. | |
| 9,604,363 B2 | 3/2017 | Ban | |
| 9,623,570 B1 | 4/2017 | Krahn et al. | |
| 9,656,813 B2 | 5/2017 | Dunkmann et al. | |
| 9,687,982 B1 | 6/2017 | Jules et al. | |
| 9,981,379 B1 | 5/2018 | Youmans et al. | |
| 9,999,977 B2 | 6/2018 | Wagner et al. | |
| 10,007,827 B2 | 6/2018 | Wagner et al. | |
| 10,058,896 B2 | 8/2018 | Hicham et al. | |
| 10,118,300 B2 | 11/2018 | Wagner et al. | |
| 10,335,956 B2 | 7/2019 | Wagner et al. | |
| 10,639,787 B2 * | 5/2020 | Wagner .................... | B25J 17/02 |
| 2001/0045755 A1 | 11/2001 | Schick et al. | |
| 2001/0056313 A1 | 12/2001 | Osborne, Jr. | |
| 2003/0038491 A1 | 2/2003 | Schmalz et al. | |
| 2003/0164620 A1 | 9/2003 | Schmalz et al. | |
| 2007/0163377 A1 | 7/2007 | Miyazawa | |
| 2008/0181485 A1 | 7/2008 | Beis et al. | |
| 2009/0019818 A1 | 1/2009 | Gilmore et al. | |
| 2010/0040450 A1 | 2/2010 | Parnell | |
| 2010/0078953 A1 | 4/2010 | Ban et al. | |
| 2010/0094461 A1 | 4/2010 | Roth et al. | |
| 2010/0101346 A1 | 4/2010 | Johnson et al. | |
| 2010/0109360 A1 | 5/2010 | Meisho | |
| 2010/0125361 A1 | 5/2010 | Mougin et al. | |
| 2010/0175487 A1 | 7/2010 | Sato | |
| 2010/0180711 A1 | 7/2010 | Kilibarda et al. | |
| 2010/0316321 A1 | 12/2010 | Nakamizo et al. | |
| 2011/0176148 A1 | 7/2011 | Briggs et al. | |
| 2013/0110280 A1 | 5/2013 | Folk | |
| 2013/0129464 A1 | 5/2013 | Regan et al. | |
| 2013/0166061 A1 | 6/2013 | Yamamoto | |
| 2013/0218335 A1 | 8/2013 | Barajas et al. | |
| 2013/0232918 A1 | 9/2013 | Lomerson, Jr. | |
| 2013/0232919 A1 | 9/2013 | Jaconelli | |
| 2013/0245824 A1 | 9/2013 | Barajas et al. | |
| 2013/0343640 A1 | 12/2013 | Buehler et al. | |
| 2013/0345872 A1 | 12/2013 | Brooks et al. | |
| 2014/0005831 A1 | 1/2014 | Naderer et al. | |
| 2014/0067121 A1 | 3/2014 | Brooks et al. | |
| 2014/0067127 A1 | 3/2014 | Gotou | |
| 2014/0105719 A1 | 4/2014 | Mueller et al. | |
| 2014/0154036 A1 | 6/2014 | Mattern et al. | |
| 2014/0305847 A1 | 10/2014 | Kudrus | |
| 2015/0081090 A1 | 3/2015 | Dong | |
| 2015/0190925 A1 | 7/2015 | Hoffman et al. | |
| 2015/0203340 A1 | 7/2015 | Jacobsen et al. | |
| 2015/0224650 A1 | 8/2015 | Xu et al. | |
| 2015/0298316 A1 | 10/2015 | Accou et al. | |
| 2015/0306770 A1 | 10/2015 | Mittal et al. | |
| 2015/0328779 A1 | 11/2015 | Bowman et al. | |
| 2015/0375401 A1 | 12/2015 | Dunkmann et al. | |
| 2016/0101526 A1 | 4/2016 | Saito et al. | |
| 2016/0221187 A1 | 8/2016 | Bradski et al. | |
| 2016/0243704 A1 | 8/2016 | Vakanski et al. | |
| 2016/0271805 A1 | 9/2016 | Kuolt et al. | |
| 2017/0021499 A1 | 1/2017 | Wellman et al. | |
| 2017/0036354 A1 | 2/2017 | Dafle et al. | |
| 2017/0050315 A1 | 2/2017 | Henry et al. | |
| 2017/0057091 A1 | 3/2017 | Wagner et al. | |
| 2017/0080571 A1 | 3/2017 | Wagner et al. | |
| 2017/0080579 A1 | 3/2017 | Wagner et al. | |
| 2017/0087718 A1 | 3/2017 | Wagner et al. | |
| 2017/0087731 A1 | 3/2017 | Wagner et al. | |
| 2017/0106532 A1 | 4/2017 | Wellman et al. | |
| 2017/0120455 A1 | 5/2017 | Wagner et al. | |
| 2017/0121113 A1 | 5/2017 | Wagner et al. | |
| 2017/0136632 A1 | 5/2017 | Wagner et al. | |
| 2017/0157648 A1 | 6/2017 | Wagner et al. | |
| 2017/0197676 A1 | 7/2017 | Wagner et al. | |
| 2017/0225330 A1 | 8/2017 | Wagner et al. | |
| 2017/0305694 A1 | 10/2017 | McMurrough et al. | |
| 2017/0322561 A1 | 11/2017 | Stiernagle | |
| 2018/0117773 A1 | 5/2018 | Odhner et al. | |
| 2018/0127219 A1 | 5/2018 | Wagner et al. | |
| 2018/0146618 A1 | 5/2018 | Elazary et al. | |
| 2018/0148272 A1 | 5/2018 | Wagner et al. | |

(56) References Cited

U.S. PATENT DOCUMENTS

| | | |
|---|---|---|
| 2018/0281202 A1 | 10/2018 | Brudniok et al. |
| 2019/0001505 A1 | 1/2019 | Wagner et al. |

FOREIGN PATENT DOCUMENTS

| | | |
|---|---|---|
| DE | 10121344 A1 | 11/2002 |
| DE | 102007054867 A1 | 5/2009 |
| DE | 102010002317 A1 | 8/2011 |
| DE | 102011115951 A1 | 4/2013 |
| EP | 1256421 B1 | 11/2002 |
| EP | 1671906 A1 | 6/2006 |
| EP | 2181814 A1 | 5/2010 |
| EP | 2708335 A1 | 3/2014 |
| EP | 2960024 A2 | 12/2015 |
| JP | H0769470 A1 | 3/1995 |
| JP | H09131685 A1 | 5/1997 |
| JP | 2010201536 A1 | 9/2010 |
| WO | 2010034044 A2 | 4/2010 |
| WO | 2014161549 A1 | 10/2014 |
| WO | 2015162390 A1 | 10/2015 |
| WO | 2016100235 A1 | 6/2016 |
| WO | 2017035466 A1 | 3/2017 |
| WO | 2017036812 A1 | 3/2017 |
| WO | 2017044632 A1 | 3/2017 |
| WO | 2017044747 A1 | 3/2017 |
| WO | 2018017616 A1 | 1/2018 |

OTHER PUBLICATIONS

Communication pursuant to Rules 161(1) and 162 EPC issued by the European Patent Office dated Oct. 24, 2019 in related European Application No. 18715158.4, 3 pages.

Liu et al., Hand-Arm Coordination for a Tomato Harvesting Robot Based on Commercial Manipulator, Proceeding of the IEEE International Conference on Robotics and Biomimetics (ROBIO), Shenzhen, China, Dec. 12, 2013, pp. 2715-2720.

Vittor et al., A Flexible Robotic Gripper for Automation of Assembly Tasks, Proceedings of the ASME Dynamic Systems and Control Division—2003, vol. 2, the 2003 ASME International Mechanical Engineering Congress, Nov. 15-21, 2003, Washington, D.C., 7 sheets.

Hebert et al., A Robotic Gripper System for Limp Material Manipulation: Hardware and Software Development and Integration, Proceedings of the 1997 IEEE international Conference on Robotics and Automation, Albuquerque, New Mexico, Apr. 20, 1997, pp. 15-21.

International Search Report and Written Opinion for International Application No. PCT/US2018/020908 dated Jun. 4, 2018, 10 pages.

Klingbeil et al., Grasping with Application to an Autonomous Checkout Robot, Robotics and Automation (ICRA), 2011 IEEE International Conference On IEEE, May 9, 2011, pp. 2837-2844, ResearchGate, retrieved from https://www.researchgate.net/publication/224252695.

International Preliminary Reporton Patentability for International Application No. PCT/US2018/020908 dated Sep. 10, 2019, 7 pages.

Carlisle B et al., A pivoting gripper for feeding industrial parts, Robotics and Automation, 1994, Proceedings, 1994 IEEE International Conference, San Diego, CA, May 8, 1994, pp. 1650-1655.

Non-Final Office Action issued by the U.S. Patent and Trademark Office dated Feb. 25, 2019 in related U.S. Appl. No. 15/912,003, 6 pages.

Final Office Action issued by the U.S. Patent and Trademark Office dated Sep. 6, 2019 in related U.S. Appl. No. 15/912,003, 7 pages.

* cited by examiner

SYSTEMS AND METHODS FOR EFFICIENTLY MOVING A VARIETY OF OBJECTS

PRIORITY

The present application is a continuation of U.S. patent application Ser. No. 15/912,003, filed Mar. 5, 2018, which claims priority to U.S. Provisional Patent Application Ser. No. 62/467,509 filed Mar. 6, 2017, the disclosures of which are hereby incorporated by reference in their entireties.

BACKGROUND

The invention generally relates to programmable motion systems and relates in particular to end effectors for programmable motion devices (e.g., robotic systems) for use in object processing such as object sortation.

End effectors for robotic systems, for example, may be employed in certain applications to select and grasp an object, and then move the acquired object very quickly to a new location. End effectors that are designed to securely grasp an object during movement may have limitations regarding how quickly and easily they may select and grasp an object from a jumble of dissimilar objects. Conversely, end effectors that may quickly and easily grasp a selected object from a jumble of dissimilar objects may have limitations regarding how securely they may grasp an acquired object during rapid movement, particularly rapid acceleration and deceleration (both angular and linear). Notwithstanding any grasp planning that the motion system may employ, it sometimes happens, for example, that an object is lifted from a point at which the object ends up presenting an unbalanced load on the end effector. This may occur for example, if the object has an uneven weight distribution that is not apparent from a visual inspection of the object.

Many end effectors employ vacuum pressure for acquiring and securing objects for transport or subsequent operations by articulated arms. Other techniques for acquiring and securing objects employ electrostatic attraction, magnetic attraction, needles for penetrating objects such as fabrics, fingers that squeeze an object, hooks that engage and lift a protruding feature of an object, and collets that expand in an opening of an object, among other techniques. Typically, end effectors are designed as a single tool, such as for example, a gripper, a welder, or a paint spray head, and the tool is typically designed for a specific set of needs.

There remains a need however, for an end effector in a programmable motion system that may select and grasp any of a wide variety of objects, and then move the acquired object very quickly to a new location when the initial grasp presents an unbalanced load.

SUMMARY

In accordance with an embodiment, the invention provides a programmable motion system including a dynamic end effector system. The dynamic end effector system includes an end effector that is coupled via a dynamic coupling to the programmable motion system, wherein the dynamic coupling provides that at least a portion of the end effector may spin with respect to an other portion of the end effector.

In accordance with another embodiment, the invention provides a programmable motion system including a dynamic end effector system comprising an end effector that includes a first portion the is coupled to the programmable motion system, and a second portion the is coupled to the first portion via a dynamic coupling such that the second portion of the end effector may spin with respect to the first portion of the end effector under a load of an object being held by the end effector.

In accordance with a further embodiment, the invention provides a method of providing a programmable motion system including a dynamic end effector system for grasping and moving objects. The method includes the steps of providing a dynamic end effector including a first portion that is coupled to the programmable motion system, and a second portion the is coupled to the first portion via a dynamic coupling; acquiring an object; and permitting the second portion of the end effector to spin with respect to the first portion of the end effector under a load of the object held by the end effector.

BRIEF DESCRIPTION OF THE DRAWINGS

The following description may be further understood with reference to the accompanying drawings in which.

The drawings are shown for illustrative purposes only.

DETAILED DESCRIPTION

If an object is grasped and lifted that has an uneven weight distribution, particularly one that is not apparent from a visual inspection of the object, there is a higher chance that the object will become separated from the end effector while being moved. While certain solutions may involve placing the object back down and repositioning the end effector on the object, such steps take time away from processing. Other systems may use the motion planning system (e.g., a robotic system) to move the end effector and object together in an position that seeks to reduce the load on the end effector, but such systems would generally require complex sensor systems to quickly detect when a load is imbalanced, as well as when the load becomes balanced.

In accordance with various embodiments, the invention provides a programmable motion system that includes a dynamic end effector system. The dynamic end effector system includes an end effector that is coupled via a dynamic coupling to the programmable motion system, wherein the dynamic coupling provides that the end effector may rotate freely with respect to the programmable motion system. The end effector may, for example, spin with respect to the programmable motion system under a load of an object being held by the end effector, and without the aid of any active motor with respect to the programmable motion system.

Figure 1:
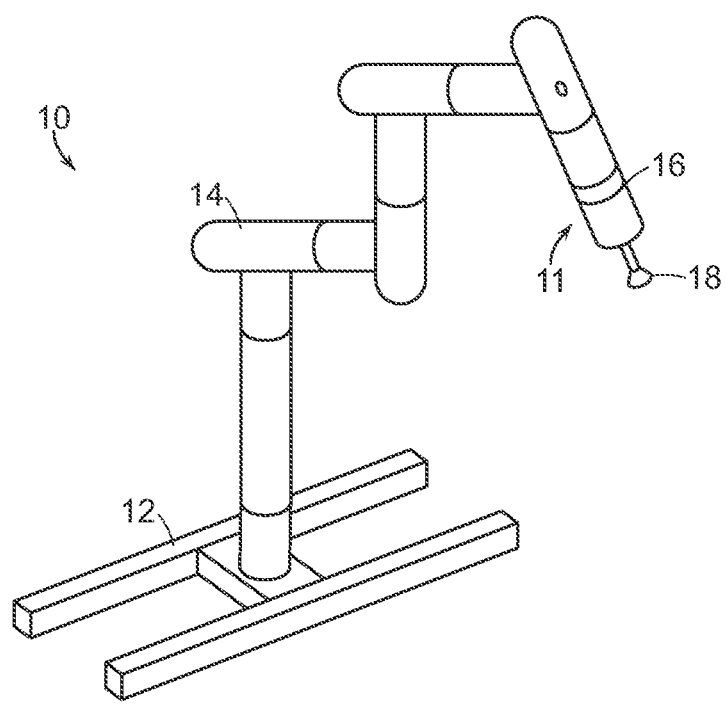
FIG. 1 shows an illustrative diagrammatic view of a programmable motion system in accordance with an embodiment of the present invention.
Figure 2:
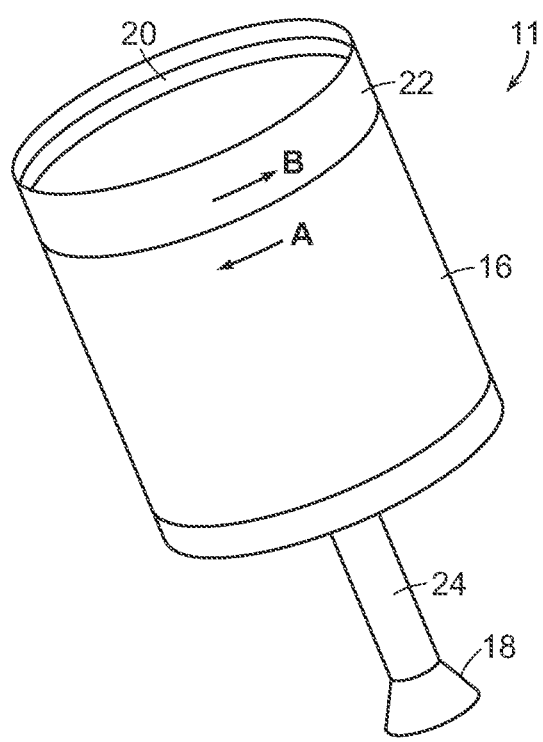
FIG. 2 shows an illustrative diagrammatic view of a dynamic end effector system in accordance with an embodiment of the present invention.

FIG. 1 for example, shows a programmable motion system 10 in accordance with an embodiment of the present invention that includes a robotic system having a base 12, an articulated arm portion 14, and a dynamic end effector system 11 that includes an attached end effector 18. As further shown in FIG. 2, the dynamic end effector system 11 may attach to the articulated arm 14 of the programmable motion device 10 by means of an attachment mechanism 20 such as threads, spring retainer clasps, or spring loaded engagement members such as ball-in-groove arrangements. In accordance with various embodiments of the invention, the dynamic end effector system includes a rotational bearing system that rotationally joins a first portion 22 (which remains fixed with respect to the attachment mechanism 20 attached to the articulated arm), and a second portion 16 that is permitted to rotate with respect to the first portion 22.

In particular, the second portion 16 of the dynamic end effector system 11 may rotate as shown at A, and may, in certain embodiments, rotate freely with respect to the first portion 22 of the dynamic end effector system, even if the first portion 22 of the dynamic end effector system is rotated in an opposite direction as shown at B. As the second portion 16 of the dynamic end effector system rotates, so too does the end effector 18 that is coupled to the lower portion of the dynamic end effector system via a shaft 24 that may, for example provide a vacuum source to the end effector 18.

Figure 3:
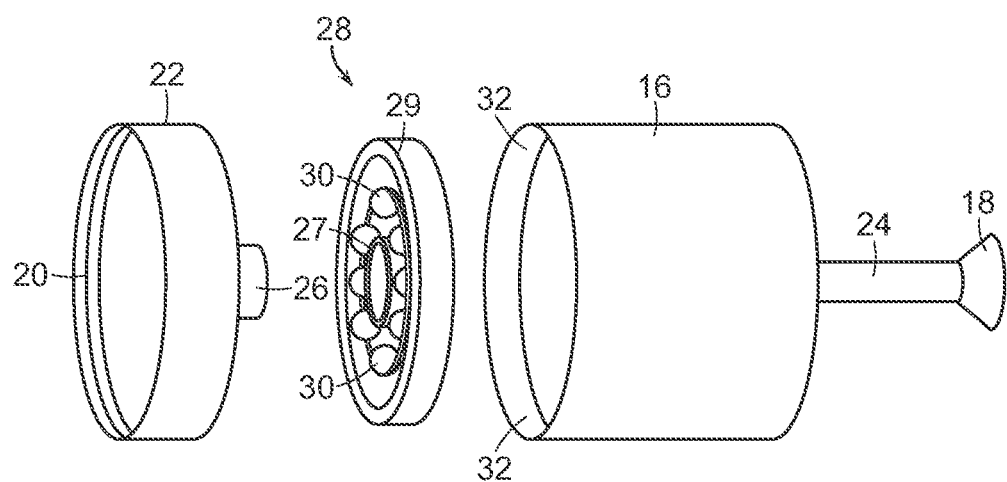
FIG. 3 shows an illustrative diagrammatic view of an exploded view of the dynamic end effector system of FIG. 2.

With reference to FIG. 3, the first portion 22 and second portion 16 of the end effector system 11 may be joined together by a rotational bearing system 28 that may, for example, be include any of a radial deep groove ball bearing, a four contact point ball bearing, a pair of tapered roller bearings, a cylindrical roller bearing, or solid bushings etc. The rotational bearing system 28 may include bearings 30, and is attached at its interior 27, for example, to a post 26 on the first portion 22 such that an interior portion 32 of the lower portion of the dynamic end effector system 16 may attach to an outer portion 29 of the rotational bearing system 28. The portion 16 of the end effector may rotate with respect to the portion 22 of the end effector freely and continuously, or in certain embodiments discussed below, may include linear or non-linear damping.

With reference to FIGS. 4A-4H, the rotational bearing system 28 may in various embodiments take many forms. For example and with reference to FIG. 4A, the system may be provided by a solid bushing 34 around a shaft 35. The suction cup of the end effector would be fixed to the outside of the bushing, and the rotating suction cup would be connected in the same place as the shaft in the illustration. Such couplings are relatively inexpensive, but have higher friction and loser fits than other types of bearings. Such solid bushings also wear more quickly than a roller—element bearing. With the minimal loads provided in embodiments of the invention however, such a bearing may last a sufficient amount of time for most systems of the invention.

Figure 4A:
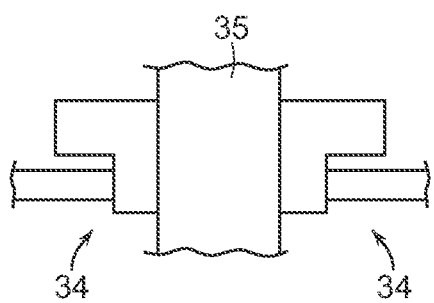
FIGS. 4A-4H show illustrative diagrammatic views of various embodiments of rotational bearing systems for use in dynamic end effector systems of the present invention.
Figure 4B:
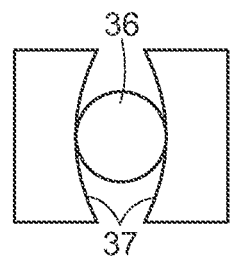
Figure 4C:
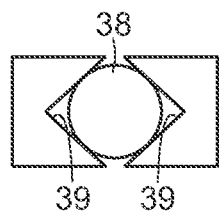

With reference to FIG. 4B, the system may be provided by a deep groove radial bearing that includes ball bearings 36 within grooves 37. The suction tube of an end effector would be fixed to the outside of the bearings, and the rotating suction cup would be connected to the inside of the bearing. Such a deep radial groove bearing is efficient and simple in design, but is not generally specified for axial loads (axial along the shaft axis, as would be applied by a load on a suction cup)), but a such a bearing of sufficient internal diameter (about 1.5 inches) to clear the airflow, that a sufficiently high maximum load may be sufficient even in the non-ideal axial loading arrangement. With reference to FIG. 4C, the system may be provided by four contact point bearings that include a ball bearing 38 within point contact surfaces 39. The suction tube would be fixed to the outside of the bearing and the rotating suction cup would be connected to the inside of the bearing. Although such a bearing may be relatively expensive, it is specifically designed for a combination of radial and axial loads.

Figure 4D:
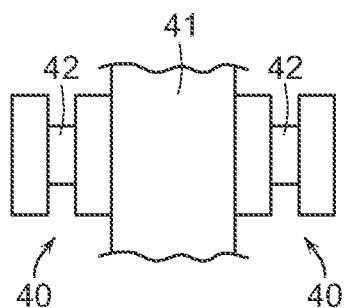
Figure 4E:
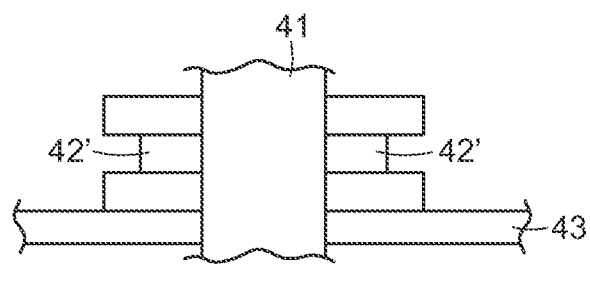

With reference to FIG. 4D, the system may be provided by a cylinder bearing 40 about a shaft 41, wherein the cylinder bearing 40 includes a cylinder roller 42. With reference to FIG. 4E, the system may be provided by a cylindrical bearing including a cylindrical roller 42' about the shaft 41. This cylindrical bearing in thrust (axial) plus radial configuration provides a different configuration of a cylindrical bearing that may be necessary to handle loads along the axial and radial directions, since the cylinders are free to slide (rather than roll) along their own axis. This combination of bearings may be necessary to handle both radial loads and axial loads in various embodiments. The suction tube would be fixed to the plate shown at 43, and the rotating suction cup would be connected in the same place as the shaft in FIG. 4E.

Figure 4F:
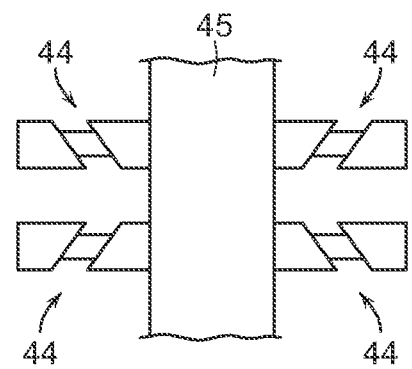
Figure 4G:
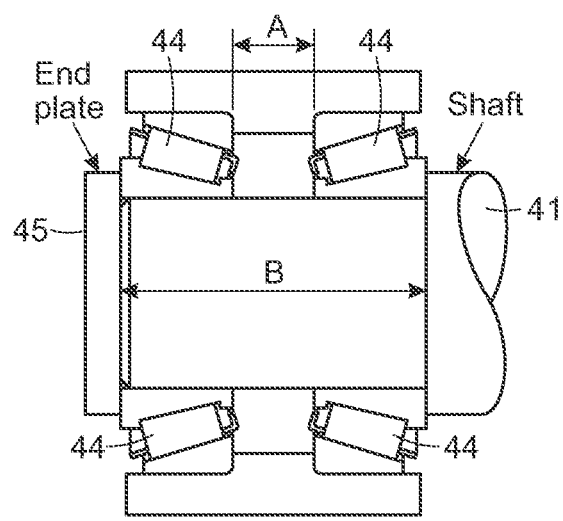

With reference to FIGS. 4F and 4G, the system may be provided by a tapered roller bearing pair 44 about a shaft 41. The tapered roller bearing pair may accept combined radial loads and trust loads in a specific direction. Thus, in order to fully constrain the output, a pair of these bearings is needed to handle loads in all possible directions. The suction tube would be fixed to the plate shown at 45, and the rotating suction cup would be connected in the same place as the shaft as shown in FIG. 4G.

Figure 4H:
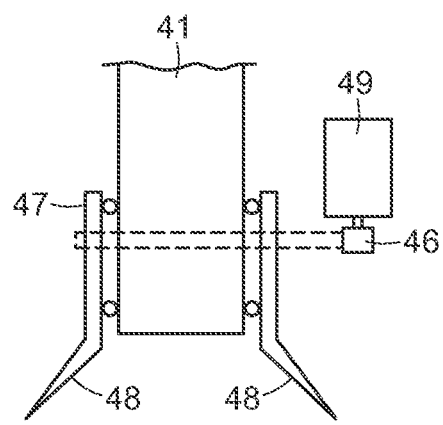

With reference to FIG. 4H, the system may be provided by a bearing structure 47 about a shaft 41, wherein the bearing structure includes a suction cup 48, wherein the bearing structure 47 is coupled to a motor 49 via a drive 46 and a belt. The motor 49 is connected to the moving side of a suction cup by the drive belt, and may be used to provide a damping force to the rotational movement.

Figure 5:
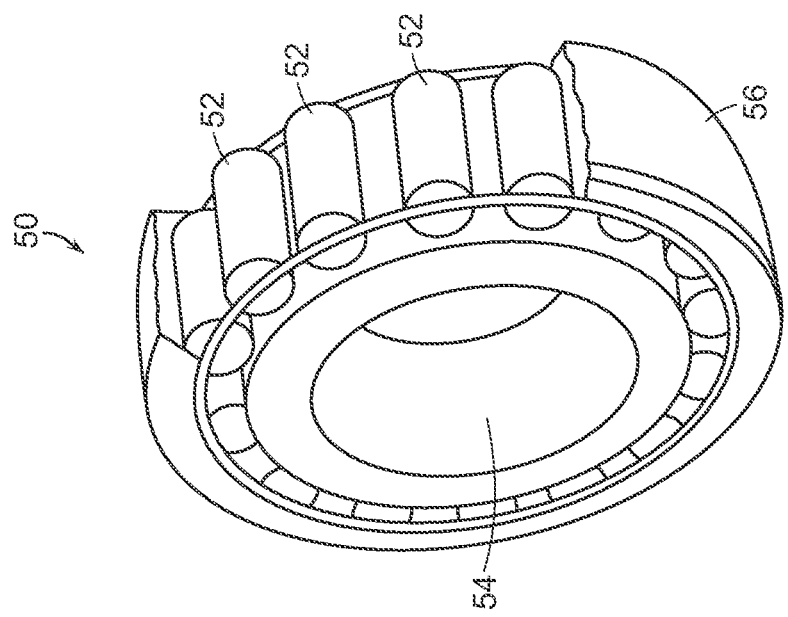
FIG. 5 shows an illustrative diagrammatic view of a dynamic end effector system in accordance with another embodiment of the present invention.

With reference to FIG. 5, the rotational bearing system in accordance with an embodiment, may include a cylindrical bearing system 50 that includes cylindrical bearings 52 and may attached at an inner ring opening 54 to the post 26 of the first portion 22 of the end effector system, which attaches to the programmable motion device by the attachment mechanism 20. Again, and similar to the embodiment of FIG. 3, the cylindrical bearing 50 may be provided therefore such that the inner ring opening 54 is connected the rotary bearing system 20, while an outer portion 56 is coupled to the interior portion 32 of the second portion 16 of the dynamic end effector system 11.

Figure 6:
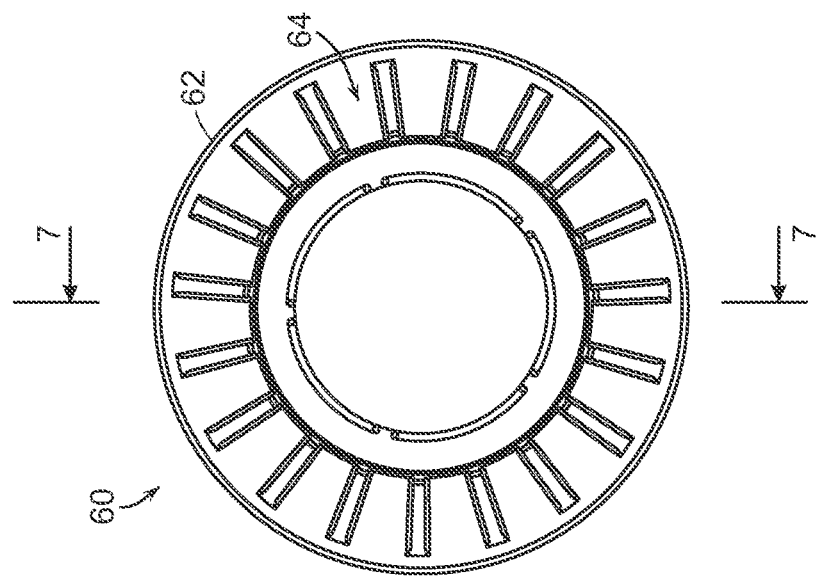
FIG. 6 shows an illustrative diagrammatic end view of a dynamic end effector system in accordance with a further embodiment of the present invention.
Figure 7:
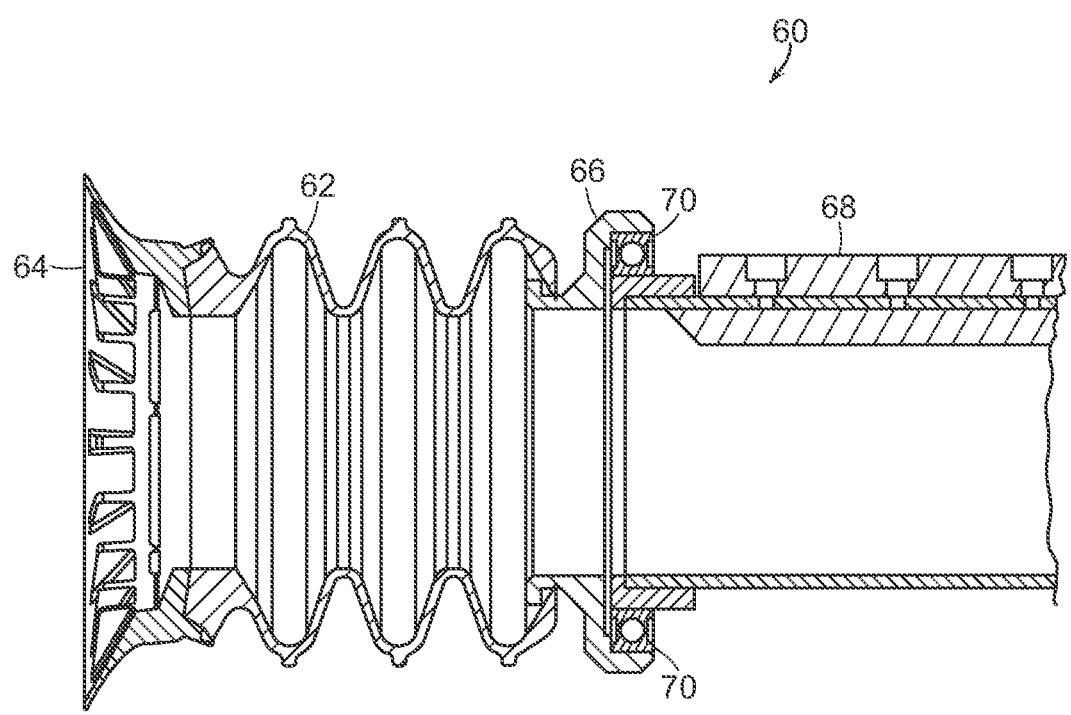
FIG. 7 shows an illustrative diagrammatic side sectional view of the dynamic end effector system of FIG. 6 taken along line 7-7 thereof.

FIGS. 6 and 7 show an end view and a side sectional view respectively of a dynamic end effector system in accordance with a further embodiment of the present invention. The dynamic end effector system 60 includes and end effector bellows 62 having an opening 64 through which vacuum is provided to engage an object. The dynamic end effector system 60 may also include a perception unit in certain embodiments, such as a camera or a scanner for inspecting input areas as well as a grasped object. As further shown in FIG. 7, the dynamic end effector system also includes a lower portion 66 the is coupled to an upper portion 68 (that in connected to a programmable motion device) via rotational bearing 70. The rotational bearing 70 permits the lower portion 66 to rotate freely with respect to the upper portion 68 as discussed above.

Figure 8A:
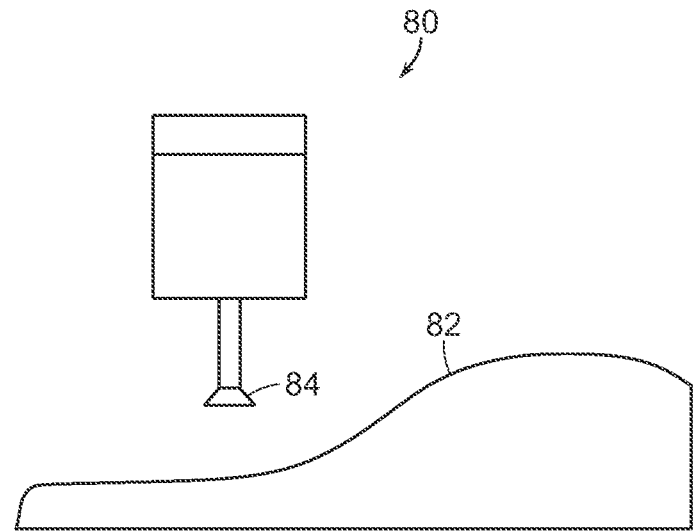
FIGS. 8A-8D show illustrative diagrammatic views of a dynamic end effector system in accordance with an embodiment of the present invention at different stages of engaging, lifting and permitting a load on the end effector to spin.
Figure 8B:
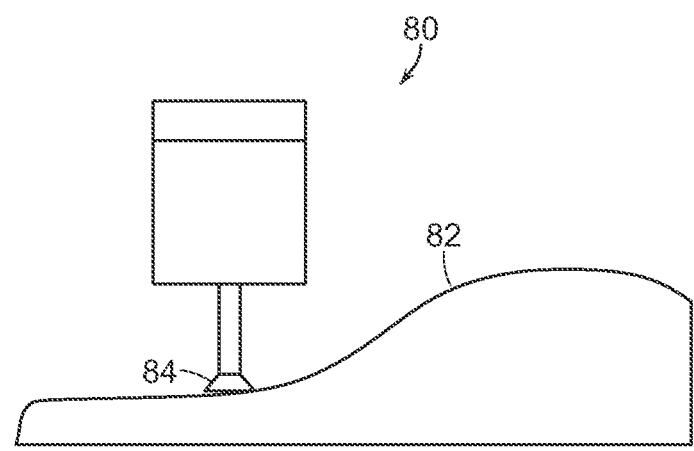
Figure 8C:
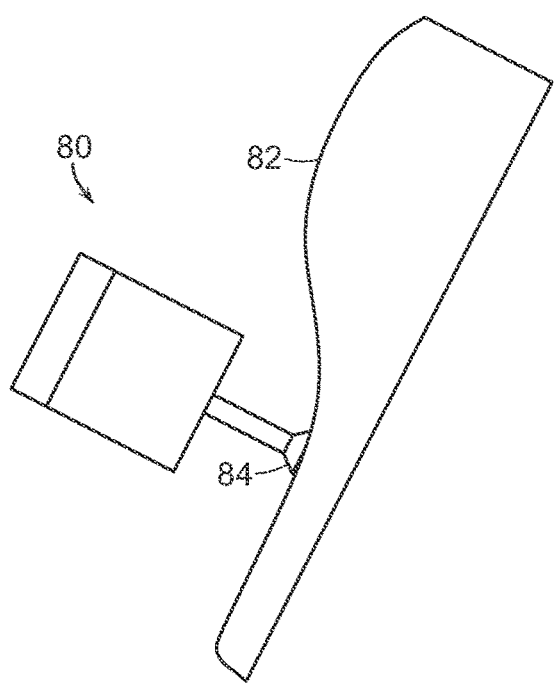
Figure 8D:
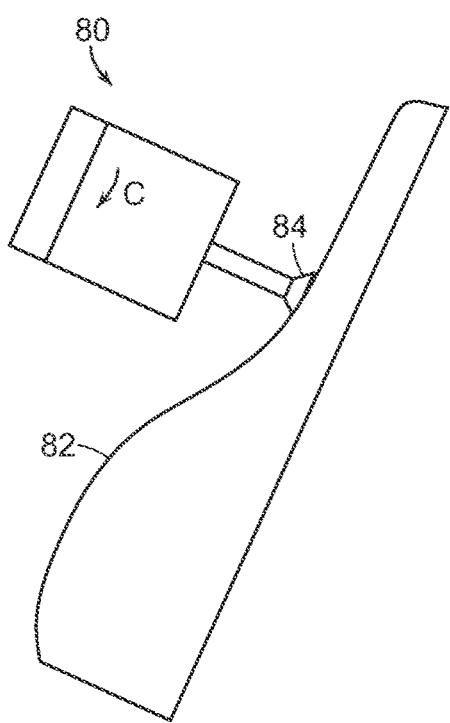

During use, the end effector portion of the dynamic end effector system may be permitted to spin so as to balance a load. For example, FIG. 8A, for example shows an dynamic end effector system 80 of any of the above disclosed embodiments approaching an object 82 such that an end effector 84 (e.g., a vacuum end effector) engages the object (as shown in FIG. 8B). As shown in FIG. 8C, when the object is initially lifted (e.g., at an angle as shown), the object 82 and the end effector 84 freely rotate as shown at C in FIG. 8D. In this way, the load on the object becomes less imbalanced by not having as much of the weight (or center of mass) above the end effector 84.

Figure 9A:
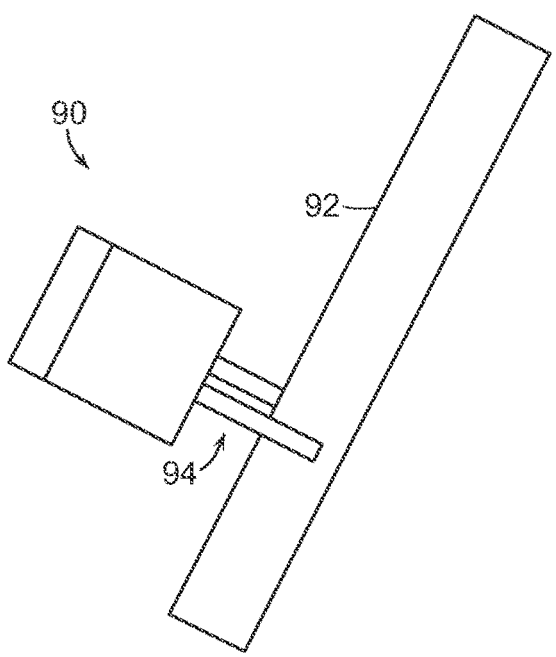
FIGS. 9A and 9B shows illustrative diagrammatic views of a dynamic end effector system in accordance with another embodiment of the present invention at different stages of permitting a load on the end effector to spin.
Figure 9B:
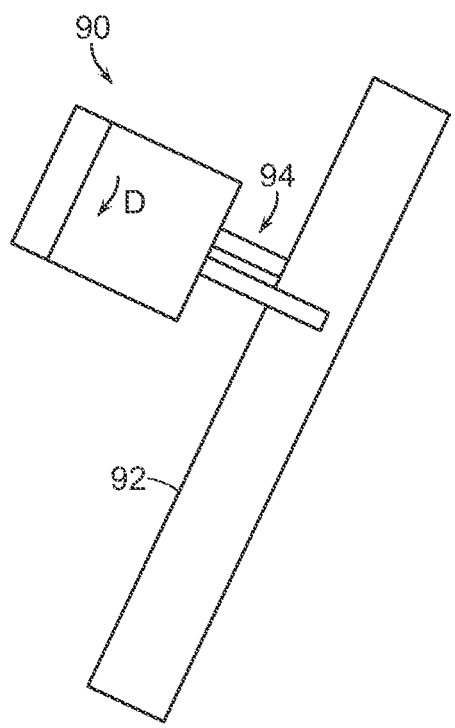
Figure 10:
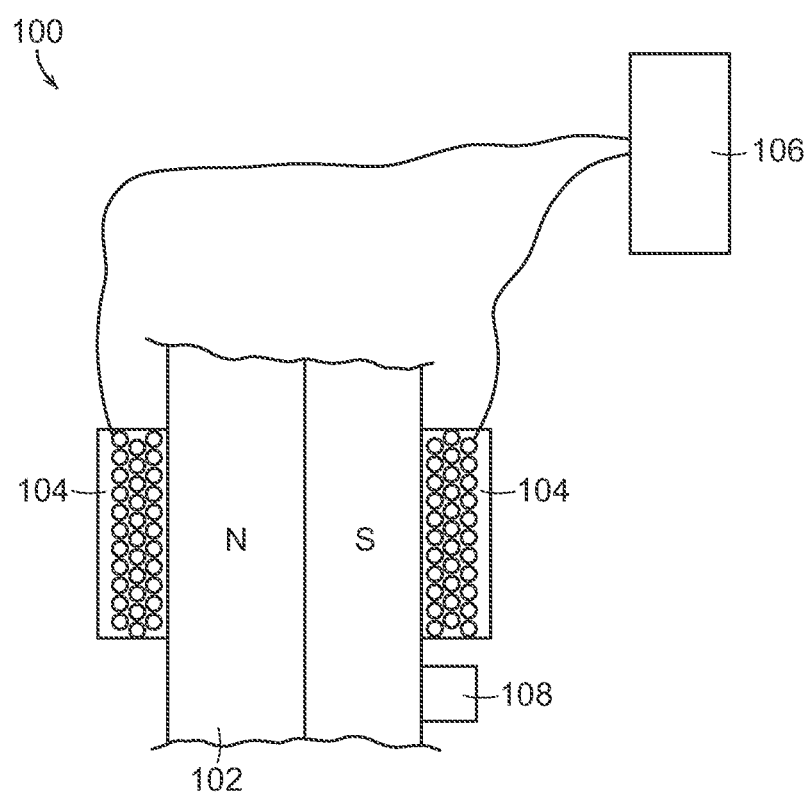
FIG. 10 shows an illustrative diagrammatic view of a portion of a dynamic end effector system in accordance with a further embodiment of the present invention.

Similarly, FIGS. 9A and 9B show an dynamic end effector system 90 of any of the above disclosed embodiments approaching an object 92 such that an end effector 94 (e.g., a pair of grippers end effector) engages the object. As shown in FIG. 9A, when the object is initially lifted (e.g., at an angle as shown), the object 92 and the end effector 94 freely rotate as shown at D in FIG. 9B. In this way, the load on the object becomes less imbalanced by not having as much of the weight (or center of mass) above the end effector 94.

A system in accordance with a further embodiment of the invention may provide the dynamic rotation discussed above, and may also include a damping source 100 of a damping force to inhibit the end of the end effector from rotating without any constraint. For example, the system may include a portion of a shaft 102 that includes a magnetic core that is surrounded in part by wound coils 104. As the shaft is rotated, the coils generate electricity, and the rotational feedback force provided by the system 100 will effectively non-linearly dampen the rotational movement of the shaft 102. In further embodiments, linear damping may be provided. Further, if desired, a controller 106 may be coupled to the coils so that they may be driven, for example, to return the shaft to a desired position after movement. Additionally, a position sensor 108 may be employed so that the system may monitor the position of the shaft at all times.

Those skilled in the art will appreciate that numerous modification and variations may be made to the above disclosed embodiments without departing from the spirit and scope of the present invention.

What is claimed is:

1. A dynamic end effector system for use with a programmable motion device, said dynamic end effector system including an end effector that is coupled via a dynamic coupling to the programmable motion device, wherein the dynamic coupling includes a rotational bearing and provides that at least a first portion of the end effector may spin through 360 degrees with respect to a second portion of the end effector, wherein the end effector includes at an acquisition end thereof an end effector opening through which a vacuum pressure is provided to engage an object, and wherein the first portion includes a first portion shaft at an interior thereof and the second portion includes a second portion shaft at an interior thereof, and wherein the first portion shaft and the second portion shaft are colinear.

2. The dynamic end effector system as claimed in claim 1, wherein said rotational bearing of the dynamic coupling includes a radial deep groove ball bearing.

3. The dynamic end effector system as claimed in claim 1, wherein said end effector includes a flexible bellows.

4. The dynamic end effector system as claimed in claim 1, wherein the end effector opening is coupled to a vacuum source that is remote from the end effector.

5. The dynamic end effector system as claimed in claim 1, wherein the vacuum pressure is provided to the end effector opening via the first portion shaft.

6. The dynamic end effector system as claimed in claim 5, wherein the vacuum pressure is provided to the end effector opening via the first portion shaft and the second portion shaft.

7. The dynamic end effector system as claimed in claim 1, wherein the dynamic coupling provides that the first portion of the end effector may spin freely with respect to the second portion of the end effector.

8. The dynamic end effector system as claimed in claim 1, wherein said dynamic coupling includes a damping source for providing a damping force inhibiting rotation of the first portion of the end effector with respect to the second portion of the end effector.

9. The dynamic end effector system as claimed in claim 8, wherein the damping source further provides that the rotational position of the first portion of the end effector may be actively controlled with respect to the second portion of the end effector.

10. The dynamic end effector system as claimed in claim 1, wherein the system further includes a position detection system for monitoring the rotational position of the first portion of the end effector with respect to the second portion of the end effector.

11. The dynamic end effector system as claimed in claim 1, wherein said rotational bearing of the dynamic coupling includes a four contact point ball bearing.

12. The dynamic end effector system as claimed in claim 1, wherein said rotational bearing of the dynamic coupling includes a pair of tapered roller bearings.

13. The dynamic end effector system as claimed in claim 1, wherein said rotational bearing of the dynamic coupling includes a cylindrical roller bearing.

14. The dynamic end effector system as claimed in claim 1, wherein said rotational bearing of the dynamic coupling includes solid bushings.

15. The dynamic end effector system as claimed in claim 1, wherein a vacuum cup is coupled to the first portion shaft.

16. A dynamic end effector system for use with a programmable motion device, said dynamic end effector system including an end effector that is coupled via a dynamic coupling to the programmable motion device, wherein the dynamic coupling includes any of a radial deep groove ball bearing, a four contact point ball bearing, a pair of tapered roller bearings, a cylindrical roller bearing, or solid bushings and provides that at least a first portion of the end effector may spin through 360 degrees with respect to a second portion of the end effector, wherein the end effector includes at an acquisition end thereof an end effector opening through which a vacuum pressure is provided to engage an object, wherein the first portion includes a first portion shaft at an interior thereof and the second portion includes a second portion shaft at an interior thereof, and wherein the first portion shaft and the second portion shaft are colinear.

17. The dynamic end effector system as claimed in claim 16, wherein the vacuum pressure is provided to the end effector opening via the first portion shaft.

18. The dynamic end effector system as claimed in claim 17, wherein the vacuum pressure is provided to the end effector opening via the first portion shaft and the second portion shaft.

19. The dynamic end effector system as claimed in claim 16, wherein said end effector includes a flexible bellows.

20. The dynamic end effector system as claimed in claim 16, wherein the end effector opening is coupled to a vacuum source that is remote from the end effector.

21. The dynamic end effector system as claimed in claim 16, wherein said dynamic coupling includes the radial deep groove ball bearing coupled to the first portion shaft.

22. The dynamic end effector system as claimed in claim 16, wherein said dynamic coupling includes the four contact point ball bearing coupled to the first portion shaft.

23. The dynamic end effector system as claimed in claim 16, wherein said dynamic coupling includes the pair of tapered roller bearings coupled to the first portion shaft.

24. The dynamic end effector system as claimed in claim 16, wherein said dynamic coupling includes the cylindrical roller bearing coupled to the first portion shaft.

25. The dynamic end effector system as claimed in claim 16, wherein said dynamic coupling includes the solid bushings coupled to the first portion shaft.

26. The dynamic end effector system as claimed in claim 16, wherein a vacuum cup is coupled to the first portion shaft.

27. The dynamic end effector system as claimed in claim 16, wherein the dynamic coupling provides that the first portion of the end effector may spin freely with respect to the second portion of the end effector.

28. The dynamic end effector system as claimed in claim 16, wherein said dynamic coupling includes a damping source for providing a damping force inhibiting rotation of the first portion of the end effector with respect to the second portion of the end effector.

29. The dynamic end effector system as claimed in claim 28, wherein the damping source further provides that the rotational position of the first portion of the end effector may be actively controlled with respect to the second portion of the end effector.

30. The dynamic end effector system as claimed in claim 16, wherein the system further includes a position detection system for monitoring the rotational position of the first portion of the end effector with respect to the second portion of the end effector.

31. A dynamic end effector system for use with a programmable motion device, said dynamic end effector system including an end effector that is coupled via a dynamic coupling to the programmable motion device, wherein the dynamic coupling provides that at least a first portion of the end effector may spin through 360 degrees with respect to a second portion of the end effector, wherein the end effector includes at an acquisition end thereof an end effector opening through which a vacuum pressure is provided to engage an object, wherein the first portion includes a first portion shaft at an interior thereof and the second portion includes a second portion shaft at an interior thereof, wherein the first portion shaft and the second portion shaft are collinear, and wherein said dynamic coupling includes a damping source for providing a damping force inhibiting rotation of the first portion of the end effector with respect to the second portion of the end effector.

32. The dynamic end effector system as claimed in claim 31, wherein said dynamic coupling includes a rotational bearing.

33. The dynamic end effector system as claimed in claim 31, wherein said dynamic coupling includes a radial deep groove ball bearing.

34. The dynamic end effector system as claimed in claim 31, wherein said dynamic coupling includes a four contact point ball bearing.

35. The dynamic end effector system as claimed in claim 31, wherein said dynamic coupling includes a pair of tapered roller bearings.

36. The dynamic end effector system as claimed in claim 31, wherein said dynamic coupling includes a cylindrical roller bearing.

37. The dynamic end effector system as claimed in claim 31, wherein said dynamic coupling includes solid bushings.

38. The dynamic end effector system as claimed in claim 31, wherein said end effector includes a flexible bellows.

39. The dynamic end effector system as claimed in claim 31, wherein the end effector opening is coupled to a vacuum source that is remote from the end effector.

40. The dynamic end effector system as claimed in claim 31, wherein the vacuum pressure is provided to the end effector opening via the first end portion shaft.

41. The dynamic end effector system as claimed in claim 40, wherein the vacuum pressure is provided to the end effector opening via the first end portion shaft and the second end portion shaft.

42. The dynamic end effector system as claimed in claim 31, wherein a vacuum cup is coupled to the first portion shaft.

43. The dynamic end effector system as claimed in claim 31, wherein the dynamic coupling provides that the first portion of the end effector may spin freely with respect to the second portion of the end effector.

44. The dynamic end effector system as claimed in claim 31, wherein the damping source further provides that the rotational position of the first portion of the end effector may be actively controlled with respect to the second portion of the end effector.

45. The dynamic end effector system as claimed in claim 31, wherein the system further includes a position detection system for monitoring the rotational position of the first portion of the end effector with respect to the second portion of the end effector.

46. A dynamic end effector system for use with a programmable motion device, said dynamic end effector system including an end effector that is coupled via a dynamic coupling to the programmable motion device, wherein the dynamic coupling provides that at least a first portion of the end effector may spin through 360 degrees with respect to a second portion of the end effector, wherein the end effector includes at an acquisition end thereof an end effector opening through which a vacuum pressure is provided to engage an object, wherein the first portion includes a first portion shaft at an interior thereof and the second portion includes a second portion shaft at an interior thereof, wherein the first portion shaft and the second portion shaft are collinear, and wherein the system further includes a position detection system for monitoring the rotational position of the first portion of the end effector with respect to the second portion of the end effector.

47. The dynamic end effector system as claimed in claim 46, wherein said dynamic coupling includes a rotational bearing.

48. The dynamic end effector system as claimed in claim 46, wherein said dynamic coupling includes a radial deep groove ball bearing.

49. The dynamic end effector system as claimed in claim 46, wherein said dynamic coupling includes a four contact point ball bearing.

50. The dynamic end effector system as claimed in claim 46, wherein said dynamic coupling includes a pair of tapered roller bearings.

51. The dynamic end effector system as claimed in claim 46, wherein said dynamic coupling includes a cylindrical roller bearing.

52. The dynamic end effector system as claimed in claim 46, wherein said dynamic coupling includes solid bushings.

53. The dynamic end effector system as claimed in claim 46, wherein said end effector includes a flexible bellows.

54. The dynamic end effector system as claimed in claim 46, wherein the end effector opening is coupled to a vacuum source that is remote from the end effector.

55. The dynamic end effector system as claimed in claim 46, wherein the vacuum pressure is provided to the end effector opening via the first end portion shaft.

56. The dynamic end effector system as claimed in claim 55, wherein the vacuum pressure is provided to the end effector opening via the first end portion shaft and the second end portion shaft.

57. The dynamic end effector system as claimed in claim 46, wherein a vacuum cup is coupled to the first portion shaft.

58. The dynamic end effector system as claimed in claim 46, wherein the dynamic coupling provides that the first portion of the end effector may spin freely with respect to the second portion of the end effector.

59. The dynamic end effector system as claimed in claim 46, wherein said dynamic coupling includes a damping source for providing a damping force inhibiting rotation of the first portion of the end effector with respect to the second portion of the end effector.

60. The dynamic end effector system as claimed in claim 46, wherein the damping source further provides that the rotational position of the first portion of the end effector may be actively controlled with respect to the second portion of the end effector.

* * * * *

UNITED STATES PATENT AND TRADEMARK OFFICE
CERTIFICATE OF CORRECTION

| | |
|---|---|
| PATENT NO. | : 11,203,115 B2 |
| APPLICATION NO. | : 16/825010 |
| DATED | : December 21, 2021 |
| INVENTOR(S) | : Thomas Wagner et al. |

Page 1 of 1

It is certified that error appears in the above-identified patent and that said Letters Patent is hereby corrected as shown below:

In the Claims

In Claim 31, Column 7, Line 63, should read:
"portion shaft and the second portion shaft are colinear, and"

In Claim 46, Column 8, Line 60, should read:
"portion shaft and the second portion shaft are colinear, and"

Signed and Sealed this
Seventeenth Day of December, 2024

Derrick Brent
*Acting Director of the United States Patent and Trademark Office*